Dec. 31, 1963 R. H. AYMAR 3,116,014

MECHANICAL BINARY ADDER

Filed Nov. 21, 1961 2 Sheets-Sheet 1

INVENTOR
Robert H. Aymar

BY Irvin A. Lavine
ATTORNEY

Dec. 31, 1963 R. H. AYMAR 3,116,014

MECHANICAL BINARY ADDER

Filed Nov. 21, 1961 2 Sheets-Sheet 2

INVENTOR
Robert H. Aymar

BY Irvin A. Lavine
ATTORNEY

United States Patent Office 3,116,014
Patented Dec. 31, 1963

3,116,014
MECHANICAL BINARY ADDER

Robert H. Aymar, Prince Georges County, Md., assignor to SCM Corporation, New York, N.Y., a corporation of New York Filed Nov. 21, 1961, Ser. No. 153,840
12 Claims. (Cl. 235—61)

The present invention relates to a computer, and more particularly to a simple mechanical computer having a series of bistable elements which act in a flip-flop manner.

Many computers are known which operate by electric or electronic means, utilizing what are known as "flip-flops" or flip-flop circuitry, in which elements of the computers occupy either one of two possible positions, or have either one or the other of two possible conditions at any given instant. Typically, these electrical or electronic elements are either conducting or non-conducting, individually.

Herefore there has not been achieved a simple computer which is analagous in operation to the electronic flip-flop computer, and which is of simple construction and which is readily operated.

The present invention contemplates the provision of two series of elements, the elements of one series being designated position element and the elements of the other series being designated transfer elements, these elements acting together to transfer input informational "bits" through the computer in serial and additive manner. Heretofore known mechanical computers of this general arrangement and type have provided such elements mounted on parallel and relatively movable plates or supporting bases, and it was necessary to translate these bases relative to each other in order to effect the transfer of a "bit" from one pair of elements, that is, a position element and its corresponding transfer element, to the next pair of elements. This previous computer was comparatively expensive and complex to manufacture and was not suited for certain uses to which the present computer readily lends itself, among these being that of an informational and instructional device capable of illustrating the relationship of the binary and decimal systems and also capable of illustrating the functioning of electrical or electronic "flip-flop" circuitry.

An object of the present invention is to provide a mechanical computer of the flip-flop type which is of extremely simple and economical construction.

Another object of the present invention is the provision of a computer which will readily demonstrate the operation of the flip-flop circuitry of electrical or electronic computers.

A further object of the present invention is to provide a computer which is capable of demonstrating the equivalency of the decimal and binary systems, allowing ready understanding and conversion of quantities expressed in the one or the other system.

Other objects and many of the attendant advantages of the present invention will be readily understood from the following specification and drawings, wherein.

Figures 1, 2, 3, 4:
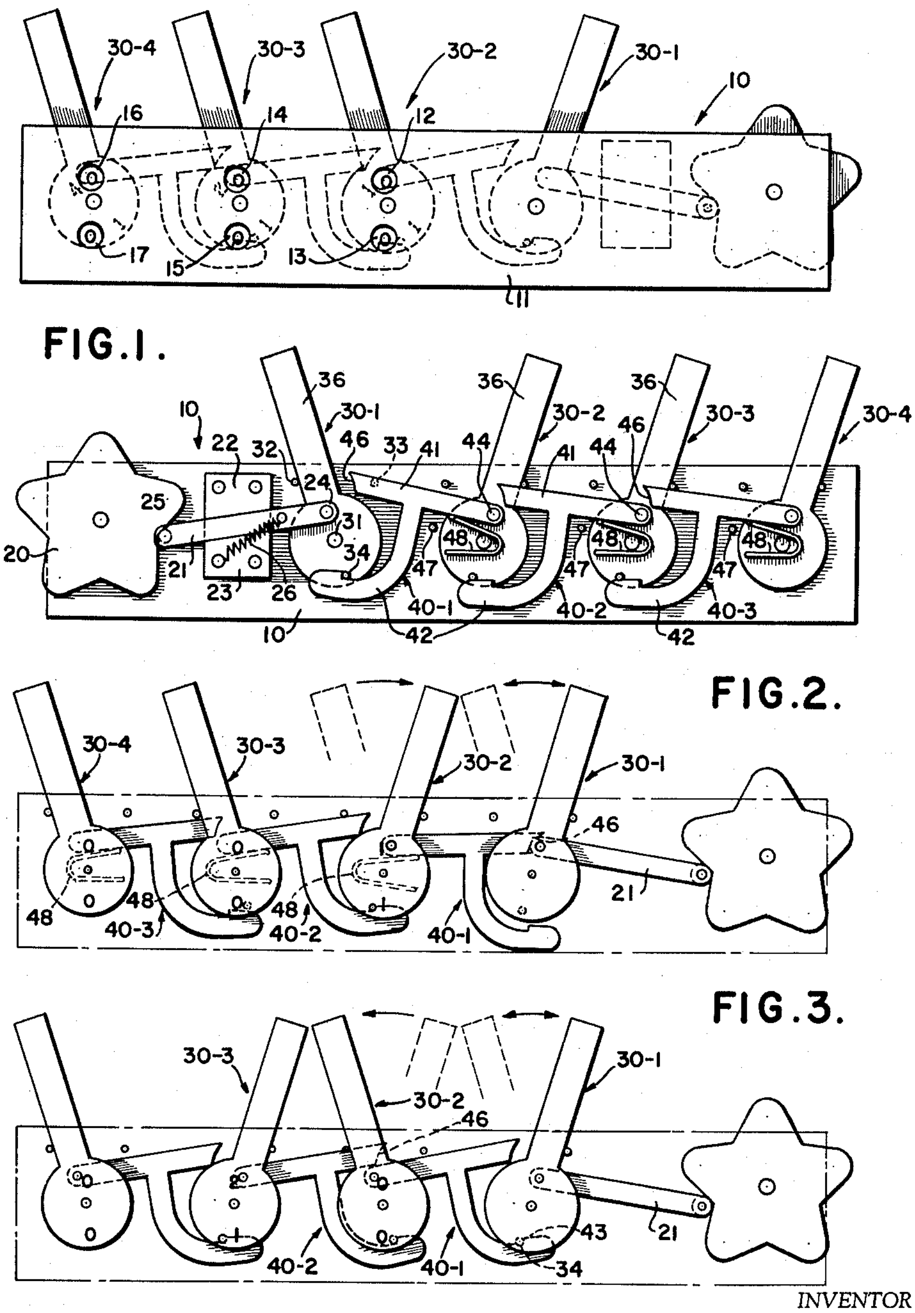
FIG. 1 is a view of a computer in accordance with the present invention.
FIG. 2 is a view of the computer of FIG. 1, and showing the computer from the opposite side thereof.
FIGS. 3 through 9 are views similar to FIG. 1, but with a base removed, of the computer in various and sequential positions thereof.

Referring now to the drawings, wherein like or corresponding reference numerals designate like or corresponding parts throughout the several views, there is shown in FIG. 1 a computer generally designated 10 comprising a base 11 which is generally planar and of rectangular configuration. The base 11 has windows 12, 13, 14, 15, 16 and 17 therein, these being arranged in pairs as shown.

Referring now to FIG. 2 there is shown a driving or input mechanism for the computer, this mechanism comprising a star wheel 20 rotatably mounted on the base 11. A follower 21 extends between guides 22 and 23 which are secured to the base 11, and has one end pivoted at 24 to a transfer element, to be described below. The other end of follower 21 has a roller 25 thereon, urged against the star wheel 20 by a spring 26.

A plurality of bistable position elements 30–1, 30–2, 30–3 and 30–4 are mounted in a series in linear array on the base 11, each of the elements 30 being pivoted to the base 11 by a suitable pin 31 that extends through a generally central part thereof. Detent pins 32 and 33 for each of the position elements 30 are secured to and extend from the base 11. The detent pins 33 determine a first position for each of the position elements 30, and the detent pins 32 determine a second position for the position elements 30.

The several position elements 30, except the last one in a series, each has a pin 34 extending therefrom, the pins 34 being parallel to and spaced from the axis of rotation of the position elements, as determined by the pin 31. The pins 34 are all on one side of, that is below, a line extending through the several pins 31. Indicators 36, which may be of any suitable shape, are provided on each position element 30.

There is also provided a second series of bistable elements, these being transfer elements, and designated 40–1, 40–2, 40–3. The transfer elements 40 are of generally J-shape, each having head pieces 41 and depending tail pieces 42 with a hook 43. Each of the transfer elements 40–1, etc. corresponds to a position element 30–1, etc., and each is pivotally connected to the next higher position element 30 by a pivot 44 which extends through an end of head piece 41 which overlies the said next higher position element 30. As will be seen, the pin 44 is generally opposite the pin 34 on each of the transfer elements. It will be further noted that the head pieces 41 extend from the pivot pins 44 on the opposite side of a line connecting the pins 31 from the pins 34.

It is the several pins 34 which cooperate with and move the hooks 43 of the several transfer elements 40, as will be further explained hereinbelow.

The free ends 46 of the several transfer element head pieces 41 are shaped to coact with the end of the adjacent head piece 41 held by the pivot pin 44, these free ends 46 being in the vicinity of the pivot pins 44.

The transfer elements 40 are movable between an upper or first position, determined by the engagement of the tail portions 42 with the pins 34, and a lower or second position determined by the detent pins 47.

A spring 48 is secured to each of the position elements 30–2, 30–3 and 30–4, and bears upwardly against the underside of the head piece 41 of that transfer element 40 which is pivotally connected to the position element 30 to which the spring 48 is secured.

Each of the position elements 30–2, 30–3 and 30–4 has numerals on the face thereof which is adjacent the base 11. Referring to FIG. 1, it will be seen that each of the position elements 30–2, 30–3 and 30–4 is in the first position thereof. In this position, each of these position elements has a numeral "0" which appears through the windows 12–17. In connection with the lower windows 13, 15 and 17, each of the position elements 30 has a numeral "1" thereon adjacent the numeral "0," which numeral 1 comes into position to be viewed through the corresponding window when the position element 30 is in the second position thereof, this being the position occupied by the element 30–1 in FIG. 1. Additionally, and adjacent the ciphers which appear through the windows or openings 12, 14 and 16 there are placed on the position elements 30–2, 30–3 and 30–4, the numerals "1," "2," and "4," respectively.

The operation of the computer in transferring informational "bits" or pulses from the input mechanism will now be described. The input mechanism, it will be understood, while stated to include the star wheel 20 and follower 21, could, instead, include only the first position member 30–1, the indicator 36 of which could be utilized as a handle for feeding "bits" of informational data into the computer. Alternatively, as will be understood, the first position element 30–1 could function as an indicating position element, as do the position elements 30–2, 30–3 and 30–4. However, for purposes of illustrating the invention and for simplicity of description, the position element 30–1 is herein considered only as a part of the input mechanism. From the positions of the various elements shown in FIGS. 1 and 2, it will be observed that position elements 30–2, 30–3 and 30–4 are in their first positions, and the cipher on these elements may be seen through the windows 12–17. The position element 30–1 is in its second position, and this may be thought of as a "cocked" position, it having already moved from its first position. Upon rotation of the star wheel 20, then, and referring first to FIG. 2, the follower 21 will cause the position element 30–1 to rotate, and pin 34 thereof will be in engagement with the hook 43 of the corresponding transfer element 40–1, and will thereby pull the entire transfer element 40–1 towards the left as viewed in FIG. 2. Because of the pivotal connection at 44 between the transfer element 40–1 and the position element 30–2, the latter will be rotated from its first position to its second position. The spring 26 will then cause the position element 30–1 to move to the second position, and the parts will be as shown in FIG. 3. It will be observed that the numerals "1" on the position element 30–2 are in position to be seen through the windows 12 and 13, thus indicating a "1" in both the binary and decimal systems.

It will be observed from FIG. 3 that when the position element 30–2 is the second position thereof, and the position element 30–1 is also in the second position, the free end 46 of transfer element 40–1 will be in contact with the end of follower 21 at its pivotal connection 24 with the position element 30–1. This position of transfer element 40–1 is the second position thereof, and occurs because of the overbalancing of the spring 48 on position element 30–2.

With the next input of a "bit" of information, the follower 21 will cause the position element 30–1 to rotate first to its first position as is indicated by dotted lines in FIG. 4, this action at the same time rotating the position element 30–2 from the second position thereof to the first position thereof, which latter is illustrated in full lines in FIG. 4, this movement occurring because of the pushing of the end of follower 21 against the free end 46 of transfer element 40–1. As the transfer element 40–1 is moved to the left, to the position shown in FIG. 4, the pin 34 thereof will engage with the hook 43 of transfer element 40–2 thereby causing transfer element 40–2 to rotate position element 30–3 from its first to its second position, which latter is shown in FIG. 4. It will be observed that the computer may then be read visually, and that the numeral "2" will be observed through window 14, on position element 30–3, and also that the numeral "1" will be read through the window 15 on the same position element. Thus, the upper or decimal readout will indicate "2" and the lower or binary readout will indicate "0–1–0," which is the designation of "2" in the binary system. It will be further noted in FIG. 4 that the free end 46 of transfer element 40–2 is above the adjacent end of transfer element 40–1, and that the hook 43 of transfer element 40–1 is in position relative to the pin 34 of position element 30–1.

Figure 5:
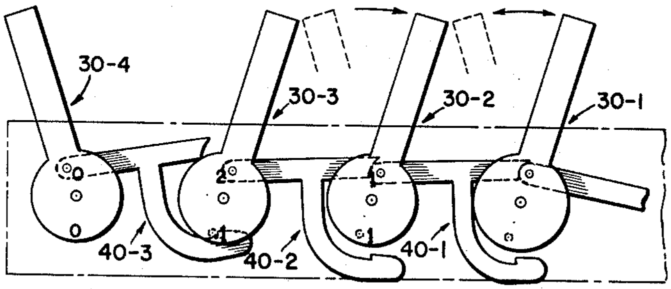

On the next movement of the follower 21, position element 30–1 will be rotated from its second to its first position, and this will cause the transfer element 40–1 to move the position element 30–2 from the first position which is shown in FIG. 4 to the second position which is shown in FIG. 5, and thence the position element 30–1 will be moved back to its second position, which is illustrated in full lines in FIG. 5. In the FIG. 5 position, position element 30–2 will have the numerals "1" thereon visible through the windows 12 and 13, and the position element 30–3 will have the numerals "2" and "1" visible through the windows 14 and 15, this indicating "3" in the decimal and binary systems.

Figure 6:
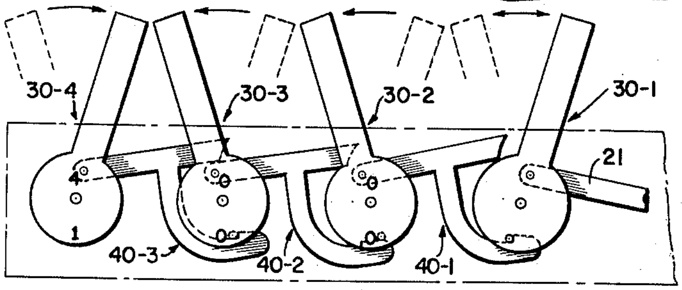

Upon further movement of actuator 21 to add in another "bit" of informational data, the follower 21 will push against the free end 46 of transfer element 40–1, and its opposite end will push against the free end of transfer element 40–2. This will thereby cause the position elements 30–2 and 30–3 to rotate from their second positions shown in FIG. 5 through their first positions, shown in FIG. 6. Also, because of the engagement of the hook 43 of transfer element 40–3 with the pin 34 of position element 30–3, transfer element 40–3 will be caused to move to the right, and will thereby cause position element 30–4 to move from the first position thereof shown in FIG. 5 of the second position thereof shown in FIG. 6. The reading will then be, through the upper windows, "4," and through the lower windows "1–0–0," both of which designate 4.

Figure 7:
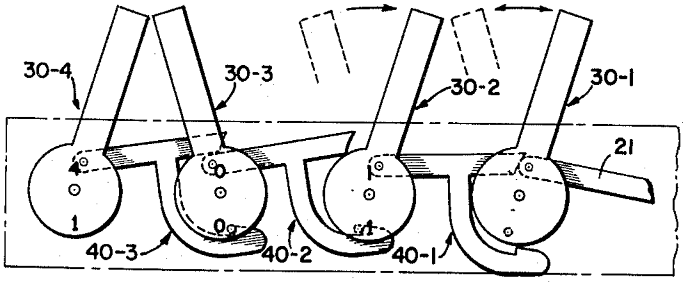
Figure 8:
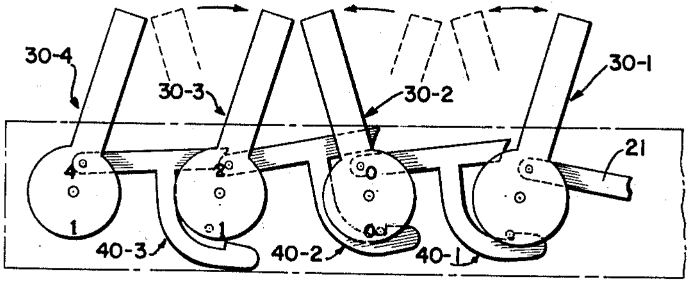
Figure 9:
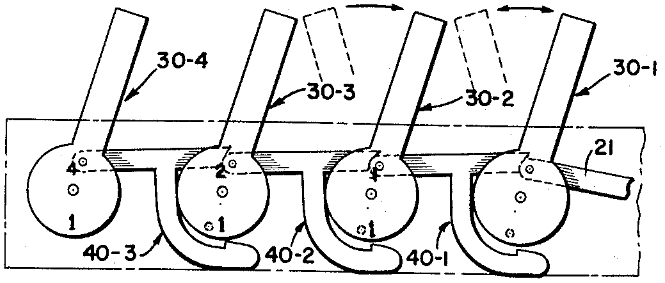

FIGS. 7, 8 and 9 illustrate the further operation of the computer 10 as additional informational "bits" are added into the computer to cause it to register, successively, the values 5, 6 and 7 in both the digital and binary systems. As will be understood, after the numeral 7 is reached on the computer illustrated, the next movement by follower 21 will cause all of the position elements to return to the positions thereof illustrated in FIGS. 1 and 2, which is the zero position of the computer. It will be observed that each of the transfer elements 40 is acted upon so as to be shifted, alternately, by the pivotal connection 44 (or 24) and the pin 34.

There has been provided a computer of simple and economical construction, operable in an analagous manner to electric flip-flop circuitry. The computer comprises a plurality of bi-stable elements all mounted on a single base member.

In addition the computer of the present invention is able to readily demonstrate the operation and interrelationship of the binary and decimal systems.

It will be obvious to those skilled in the art that various changes may be made without departing from the spirit of the invention and therefore the invention is not limited to what is shown in the drawings and described in the specification but only as indicated in the appended claims.

What is claimed is:

1. In combination a base, a series of generally similar bistable position elements in linear array on said base, means for mounting each said position element on said base for pivotal movement about an axis through said element, detent means on said base cooperable with each said position element for determining first and second positions thereof, each said position element except the last having a pin parallel to and spaced from the axis of rotation thereof, said pins being on one side of a line through the pivoted connections of said elements, a series of generally similar bistable transfer elements of generally J-shape and each having a head piece extending generally parallel to and on the opposite side of said line from said pins, means pivotally connecting an end of each transfer element head piece to the next higher position element at a point opposite the pin thereof, each said transfer element having a tail piece with a hook thereon adapted to cooperate with the pin of the corresponding position element thereof during a first movement of said position element from first to second position, the head piece of each said transfer element extending from the pivotal connection thereof and having a free end in the vicinity of the head piece pivotal connecting means of the corresponding position element, means for establishing each said transfer element free end in juxtaposition with the pivotal end of the next lower adjacent transfer element when the position element to which the transfer element is connected is in the second position thereof, and spring means for moving said transfer element to a second position when the position element to which it is attached is in the first position thereof, said transfer element free end in the second position thereof being out of juxtaposition with the pivotal end of the next lower adjacent transfer element.

2. The combination of claim 1, said base having a series of apertures therethrough each in association with a said position element, the position elements each having a cipher visible through an aperture when in the first position thereof and each having a "1" visible through said aperture when in the second position thereof.

3. The combination of claim 2, said base having a second series of apertures therethrough each in association with a said position element, the position elements each having a cipher visible through an aperture of the second series when in the first position thereof and said position elements when in the second positions having the numerals of the series 1, 2, 4 . . . visible through the apertures of the second series.

4. In combination a base, a series of generally similar bistable position elements in linear array on said base, means for mounting each said position element on said base for pivotal movement about an axis through said element, means on said base cooperable with each said position element for determining first and second positions thereof, each said position element except the last having a pin parallel to and spaced from the axis of rotation thereof, said pins being on one side of a line through the pivoted connections of said elements, a series of generally similar bistable transfer elements, each having a head piece extending generally parallel to and on the opposite side of said line from said pins, means pivotally connecting an end of each transfer element head piece to the next higher position element at a point opposite the pin thereof, each said transfer element having means for cooperating with the pin of the corresponding position thereof during a first movement of said position element from first to second position, the head piece of each said transfer element extending from the pivotal connection thereof and having a free end in the vicinity of the head piece pivotal connecting means of the corresponding position element, means for establishing each said transfer element free end in juxtaposition with the pivotal end of the next lower adjacent transfer element when the position element to which the transfer element is connected is in the second position thereof, and spring means for moving said transfer element to a second position when the position element to which it is attached is in the first position thereof, said transfer element free end in the second position thereof being out of juxtaposition with the pivotal end of the next lower adjacent transfer element.

5. In combination a base, a series of generally similar bistable position elements in linear array on said base, means for mounting each said position element on said base for pivotal movement about an axis through said element, means on said base cooperable with each said position element for determining first and second positions thereof, a series of generally similar bistable transfer elements each having a head piece pivotally connected at one end to the next higher position element, the head piece of each said transfer element extending from the pivotal connection thereof and having a free end in the vicinity of the head piece pivotal connection of the corresponding position element, said position elements being rotatable about the pivotal connections thereof between a first position in which the head piece free end is in alignment with the head piece pivotal connection of the next higher transfer element and a second position in which the said free end is in alignment with the said next higher head piece pivotal connection.

6. In combination a plurality of pairs of bistable elements each having a first and a second position, means for shifting a first element of a pair between first and second positions thereof, means connecting the second element of each pair with the first element of the next higher pair, cooperating means on each pair of elements for shifting a second element from its first to its second position when the first element of the pair is shifted from its second to its first position and for shifting the second element from its second to its first position during the succeeding movement of the first element from its second to its first position.

7. The combination of claim 6, said first elements being mounted in serial array on a base.

8. The combination of claim 7, said base having windows therethrough and said first elements having numerals thereof successively visible through said windows in the two positions thereof.

9. The combination of claim 6, said cooperating means comprising an abutment on said first element and a cooperating part on said second element engageable therewith when said second element is in the second position thereof.

10. The combination of claim 6, said cooperating means comprising a pin extending from said first element and a hook on said second element engageable with said pin in the first position of said second element.

11. A binary adding mechanism comprising: a supporting framework, a plurality of elements each mounted on said framework for incremental movement between "0" and "1" binary value representative positions, two drive members carried by each element, a drive transmitting device pivotally mounted on each higher order element and having two portions on a free end thereof for engaging respective ones of the two drive members on an adjacent lower order element, said lower order element being invariably operable during each two increments of movement thereof to transmit a single increment of binary movement through said drive transmitting device to said adjacent higher order element.

12. A binary adding mechanism as defined in claim 11 in which the drive transmitting device is alternately engaged with first one and then the other of said two drive members.

References Cited in the file of this patent

UNITED STATES PATENTS

| | | |
|---|---|---|
| 2,658,972 | Brown | Nov. 10, 1953 |
| 2,973,898 | Reynolds | Mar. 7, 1961 |
| 3,006,082 | Libbey | Oct. 31, 1962 |